United States Patent
Yim et al.

(10) Patent No.: US 7,609,615 B2
(45) Date of Patent: Oct. 27, 2009

(54) METHOD AND APPARATUS FOR PERFORMING CHANNEL COMPENSATION AND SYMBOL DEMODULATION FOR COHERENT DEMODULATION IN AN OFDM SYSTEM

(75) Inventors: Eun-Jeong Yim, Seongnam-si (KR); Ji-Won Ha, Seoul (KR); Hee-Jin Roh, Suwon-si (KR); Sung-Jin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 11/455,784

(22) Filed: Jun. 20, 2006

(65) Prior Publication Data

US 2006/0285603 A1    Dec. 21, 2006

(30) Foreign Application Priority Data

Jun. 20, 2005  (KR) .................... 10-2005-0052943

(51) Int. Cl.
*H04L 5/12* (2006.01)
(52) U.S. Cl. ................. 370/208; 375/262; 375/267; 375/341; 714/794; 714/795; 714/796; 704/242
(58) Field of Classification Search ................... None
See application file for complete search history.

(56) References Cited

U.S. PATENT DOCUMENTS 7,065,146 B1 *  6/2006  Lou et al. ................. 375/262
7,346,135 B1 *  3/2008  Narasimhan ............. 375/346

OTHER PUBLICATIONS

Miniuk, Mary, Channel Impulse Response and Its Relationship to Bit Error Rate at 28 GHz, Dec. 2003, pp. 6-7.*

* cited by examiner

*Primary Examiner*—Chirag G Shah
*Assistant Examiner*—Steve Young
(74) *Attorney, Agent, or Firm*—Roylance, Abrams, Berdo & Goodman, L.L.P.

(57) ABSTRACT

A method and apparatus for performing channel compensation and symbol demodulation using an estimated channel impulse response during coherent demodulation of a received Orthogonal Frequency Division Multiplexing (OFDM) signal are provided. In the apparatus, an FFT processor IFFT-processes a received signal. A channel compensator generates a channel-compensated signal by multiplying the FFT received signal by an estimated channel impulse response and calculates the power of the estimated channel impulse response. A symbol demodulator sets the power of the estimated channel impulse response as a reference point defining a minimum distance between signal points in a signal constellation, and decides soft metric values for channel decoding using the reference point and I-channel and Q-channel signal components of the channel-compensated signal. A decoder recovers information bits by decoding the soft metric values.

4 Claims, 7 Drawing Sheets

METHOD AND APPARATUS FOR PERFORMING CHANNEL COMPENSATION AND SYMBOL DEMODULATION FOR COHERENT DEMODULATION IN AN OFDM SYSTEM

PRIORITY

This application claims the benefit under 35 U.S.C. § 119 (a) of a Korean Patent Application filed in the Korean Intellectual Property Office on Jun. 20, 2005 and assigned Serial No. 2005-52943, the entire disclosure of which is hereby incorporated by reference.

BACKGROUND OF THE INVENTION

1. Field of the Invention

The present invention relates generally to an Orthogonal Frequency Division Multiplexing (OFDM) system. More particularly, the present invention relates to a method and apparatus for performing compensation of channel characteristics and demapping to a soft metric value using an estimated channel impulse response during coherent demodulation.

2. Description of the Related Art

In an OFDM system, a whole frequency band is divided into a plurality of subcarrier bands. Subchannel signals are mapped to the subcarriers by Inverse Fast Fourier Transform (IFFT) for transmission. During a reception operation, a received OFDM signal is divided into the subchannel signals by Fast Fourier Transform (FFT). Similar to other systems using radio channels, the OFDM system estimates a channel impulse response H representing the channel characteristics from a transmitter to a receiver and performs channel compensation for a received signal Y based on the channel impulse response.

Two modes of equalization, such as Zero-Forcing (ZF) and Minimum Mean Square Error (MMSE), are available for channel compensation in OFDM. Despite the advantage of simplicity, the ZF equalization does not compensate for noise. This lack of compensation leads to performance degradation. Alternatively, the MMSE equalization does provide noise compensation. However, it has drawbacks because there is a requirement for an estimation of standard noise deviation. The two algorithms commonly compensate for channel characteristics that the received signal assumes, before demodulation through symbol demapping.

FIG. 1 is a block diagram of a receiver in a conventional OFDM system.

Referring to FIG. 1, an Analog-to-Digital Converter (ADC) 104 converts an analog signal received through an antenna 102 to a digital signal. An FFT processor 106 transforms the digital signal to a frequency-domain signal. Since the frequency signal contains the effects of a channel, an equalizer 108 is included after the FFT 106 in order to eliminate the channel effects before decoding by a decoder 112.

The equalizer 108 eliminates the channel effects from the received signal by division operations. A symbol demodulator 110 equivalent to a symbol demapper demaps the channel-compensated signal received from the equalizer 108 to a signal point on a signal constellation corresponding to a predetermined modulation scheme, and to in-phase (I channel) and quadrature-phase (Q channel) soft metric values representing the signal point. The decoder 112 recovers the original information bits by decoding the soft metric values.

As stated before, the equalizer 108 performs division operations for channel compensation. The following description is made of the operation of the equalizer 108 in the context of ZF that facilitates simple hardware implementation. ZF is expressed as $$y_k/\hat{H}_k = \hat{H}_k^* y_k / (\hat{H}_k^* \hat{H}_k) \qquad (1)$$

where $y_k$ denotes a received signal and $\hat{H}_k$ denotes a channel impulse response representing estimated channel characteristics.

FIG. 2 is a detailed diagram illustrating the structure of a conventional equalizer.

Referring to FIG. 2, the equalizer includes complex multipliers 202 and 204, a complex multiplier 206, and dividers 208 and 210. The complex multipliers 202 and 204 multiply the I-channel and Q-channel components of a received signal $y_k$ corresponding to a $k^{th}$ modulation symbol, FFT_out$_k$_I and FFT_out$_k$_Q by the I-channel and Q-channel components of the channel impulse response $H_k$ of the $k^{th}$ modulation symbol, Ch_Est_out$_k$_I and Ch_Est_out$_k$_Q. The complex multiplier 206 calculates the power of the channel impulse response $H_k$. The dividers 108 and 210 divide the products received from the complex multipliers 202 and 204 by the power of the channel impulse response $H_k$ and output the resulting channel-compensated I-channel and Q-channel components Est_Sym_out$_k$_I and Est_Sym_out$_k$_Q.

Referring to FIG. 1, the symbol demodulator 110 determines soft metric values corresponding to Est_Sym_out$_k$_I and Est_Sym_out$_k$_Q based on the signal constellation and a reference point (a) which defines a minimum distance between signal points of the signal constellation. FIG. 3 illustrates a 16-ary Quadrature Amplitude Modulation (16QAM) signal constellation for symbol mapping and demapping. The horizontal axis represents the I channel and the vertical axis represents the Q channel. As illustrated in FIG. 3, 16 4-bit signal points corresponding to 16 modulation symbols have a minimum distance of 2a according to one another. Preferably, (a) is referred to as the reference point of the signal constellation.

The symbol demodulator 110 determines the soft metric values using Est_Sym_out$_k$_I and Est_Sym_out$_k$_Q and the reference point (a). Conventionally, the reference point (a) is a constant, for example, '1'. While 16QAM has been described, it is shown for illustrative purposes and it is to be understood that the same signal constellation applies to any modulation scheme with a higher order equal to or higher than that of Quadrature Phase Shift Keying (QPSK).

The above-described conventional technology suffers from two problems. One is the requirement for divisions. Implementation of complex divisions in hardware is as complex as multiplication by five times. The other problem is that the division of a received signal by channel power gives a reliability level to the signal which is not suitable for decoder input. When a received signal (a low-reliability signal) affected by a channel with low signal power and high noise power is divided by the power of the channel, the decoder incorrectly decides that the received signal is highly reliable. The resulting decoding errors cause an error flow even in a high Signal-to-Noise Ratio (SNR) environment.

Accordingly, there is a need for an improved technique and apparatus for performing channel compensation and symbol demodulation to overcome the requirement for divisions and a low-reliability signal.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and apparatus for performing channel compensation and symbol demodulation for preventing complexity increase and degradation of decoding performance caused by division during channel compensation of a received signal in an OFDM system.

According to one aspect of an exemplary embodiment of the present invention, a channel-compensated signal is generated by multiplying an FFT received signal by an estimated channel impulse response in a method of performing channel compensation and symbol demodulation on a received signal in an OFDM system. The power of the estimated channel impulse response is calculated and set as a reference point defining a minimum distance between signal points in a signal constellation used for modulation of the FFT received signal. Soft metric values for channel decoding of the channel-compensated signal are determined using the reference point, and I-channel and Q-channel signal components of the channel-compensated signal.

According to another aspect of an exemplary embodiment of the present invention, an FFT processor IFFT-processes a received signal in a apparatus in an OFDM system. A channel compensator generates a channel-compensated signal by multiplying the FFT received signal by an estimated channel impulse response and calculates the power of the estimated channel impulse response. A symbol demodulator sets the power of the estimated channel impulse response as a reference point defining a minimum distance between signal points in a signal constellation used for modulation of the FFT received signal. The symbol demodulator also decides soft metric values for channel decoding of the channel-compensated signal using the reference point and I-channel and Q-channel signal components of the channel-compensated signal. A decoder recovers information bits by decoding the soft metric values.

BRIEF DESCRIPTION OF THE DRAWINGS

The above and other exemplary objects, features and advantages of the present invention will become more apparent from the following detailed description when taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An exemplary embodiment of the present invention is intended to provide a technique for adaptively determining a reference point of symbol demodulation based on the power of a channel impulse response during channel compensation and symbol demodulation in an OFDM receiver.

Figure 4:
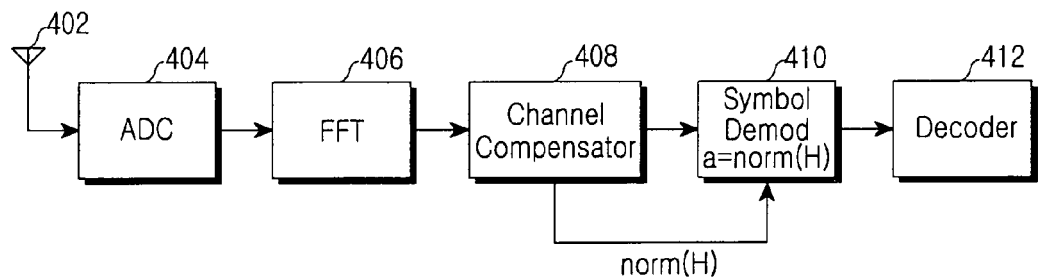
FIG. 4 is a block diagram of a receiver in an OFDM system according to an exemplary embodiment of the present invention.

FIG. 4 is a block diagram of a receiver in an OFDM system according to an exemplary embodiment of the present invention.

Referring to FIG. 4, an ADC 404 converts a received analog signal to a digital signal. The received analog signal has been received through an antenna 202 and frequency-upconverted by a Radio Frequency (RF) unit (not shown). An FFT processor 406 transforms the digital signal to a frequency-domain signal which includes the effects of a channel. A channel compensator 408 follows the IFFT 406 to eliminate the channel effects.

Figure 1:
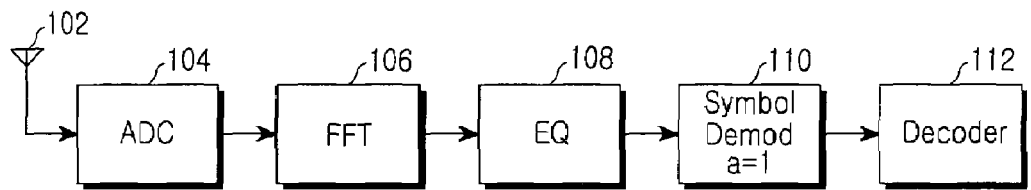
FIG. 1 is a block diagram of a receiver in a conventional OFDM system.
Figure 2:
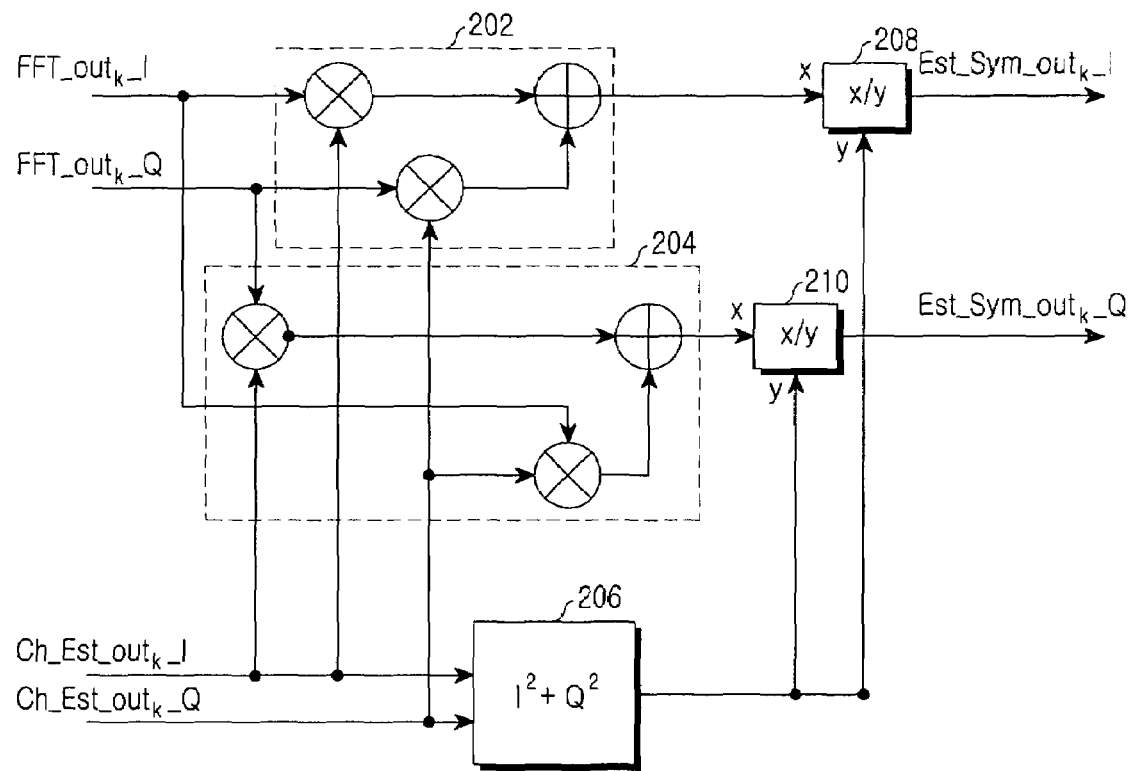
FIG. 2 illustrates the structure of a conventional ZF equalizer.

Compared to the receiver illustrated in FIG. 1, the channel compensator 408 substitutes for the equalizer 108, and the symbol demodulator 410 calculates soft metric values by considering the norm, such as power of a channel impulse response H received from the channel compensator 408 to be a reference point a for symbol demodulation. The reference point (a) is related to the minimum distance between signal points in a signal constellation. A decoder 412 recovers information bits from the soft metric values. Soft metric values are achieved adaptively according to time-variant changes of a received signal by using the power of H as the reference point (a), rather than using a preset constant between the transmitter and the receiver as the reference point (a).

The channel compensator 408 eliminates the effects of the channel from the received signal by multiplying the frequency-domain signal received from the FFT processor 406 by the channel impulse response H estimated by a channel estimator (not shown). A symbol demodulator 410 detects a signal point closest to the channel-compensated complex signal received from the channel compensator 408 using a modified signal constellation created by the reference point (a) which is the power of the channel impulse response H, instead of a signal constellation corresponding to a predetermined modulation scheme. The symbol demodulator 410 decides on I-channel and Q-channel soft metric values representing the signal point. The decoder 412 recovers the original information bits by decoding the soft metric values.

To avoid division operation during channel compensation, unlike the conventional equalizer, the channel compensator 408 tells the symbol demodulator 410 the power value of the channel impulse response H as the reference point (a) and outputs a signal whose channel is compensated without division operation by $$\hat{H}_k^* y_k = \hat{H}_k^* H_k x_k + \hat{H}_k^* n_k \quad (2)$$

where $x_k$ denotes a $k^{th}$ transmitted modulation symbol, $n_k$ denotes noise in $x_k$, $y_k$ denotes a received signal for the $k^{th}$ transmitted modulation symbol, and $\hat{H}_k$ denotes the channel impulse response of the $k^{th}$ transmitted modulation symbol. The reference point (a) is given by $$a = (\hat{H}_k^* \hat{H}_k) \quad (3)$$

That is, the channel compensator 408 creates the channel-compensated signal expressed as Equation (2) by multiplying the channel impulse response by the FFT signal and outputs the power of the channel impulse response as the reference point (a). The symbol demodulator 110 calculates soft metric values for each bit of the modulation symbol for the input of the channel-compensated signal and the reference point (a).

Figure 5:
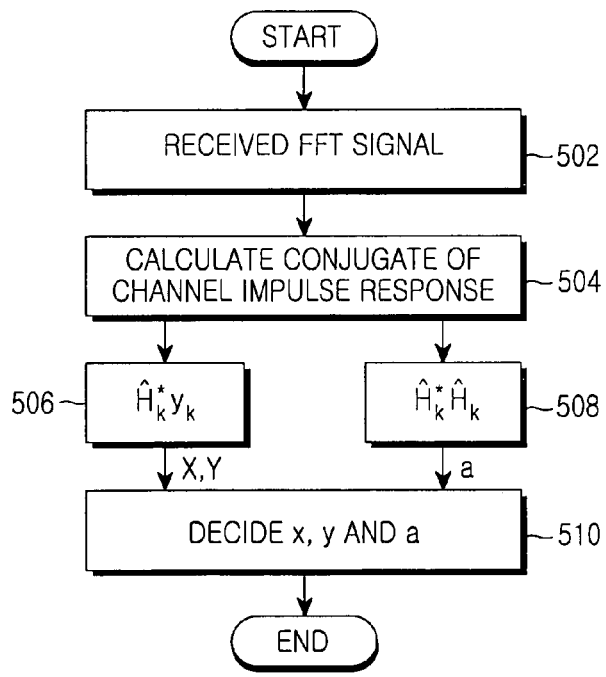
FIG. 5 is a flowchart illustrating channel compensation according to an exemplary embodiment of the present invention.

FIG. 5 is a flowchart illustrating the channel compensation according to an exemplary embodiment of the present invention.

Referring to FIG. 5, the channel compensator 408 receives an FFT signal from the FFT processor 406 in step 502 and calculates an estimated conjugate $\hat{H}_k^*$ of the channel impulse response representing the characteristics of a radio channel that the received signal has experienced in step 504. "^" of $\hat{H}_k^*$ denotes an estimate of $\hat{H}_k^*$. In step 506, the channel compensator 406 multiplies the FFT signal by $\hat{H}_k^*$ and outputs the resulting I-channel and Q-channel components X and Y. The channel compensator 409 calculates the norm, such as power of the channel impulse response by $\hat{H}_k^*$ in step 508. The channel compensator 408 provides the power of the channel impulse response to the symbol demodulator 410 as the reference point (a) by which to decide soft metric values in step 510.

Figure 6:
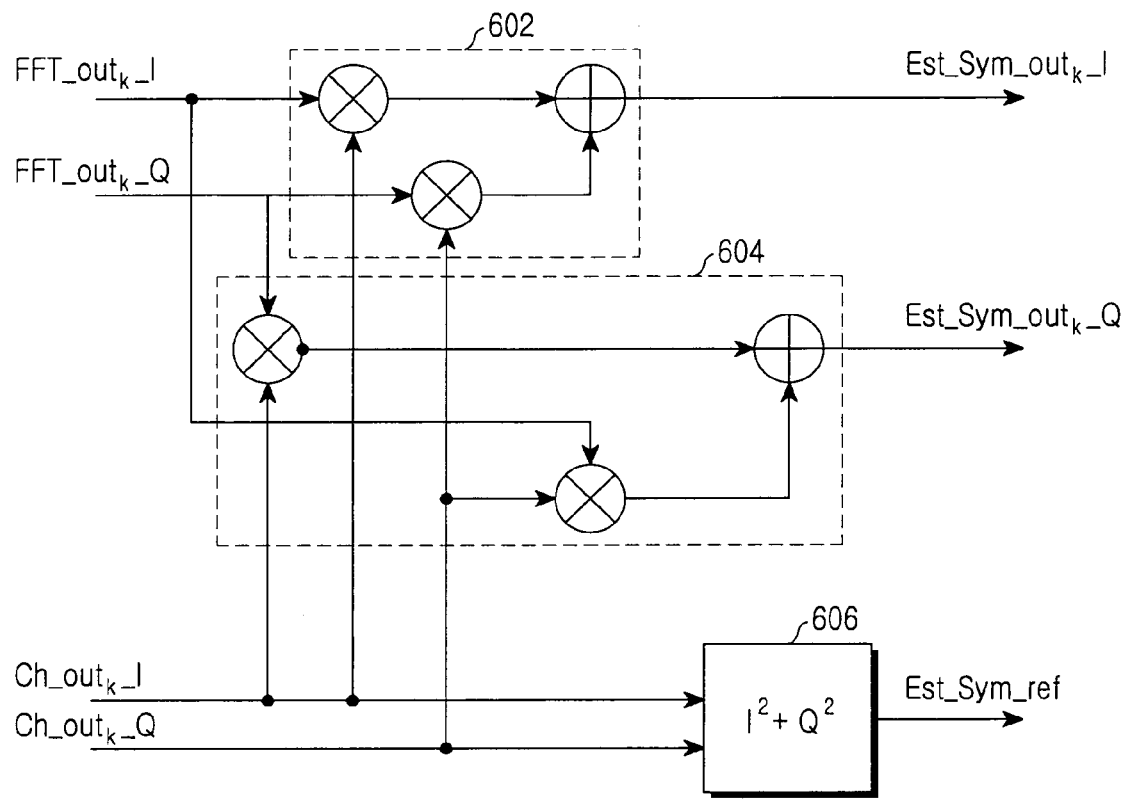
FIG. 6 illustrates the structure of a channel compensator according to an exemplary embodiment of the present invention.

FIG. 6 illustrates the structure of the channel compensator 408 according to an exemplary embodiment of the present invention.

Referring to FIG. 6, the channel compensator includes complex multipliers 602 and 604 and a power calculator 606. The complex multipliers 602 and 604 multiply the I-channel and Q-channel components of a received frequency-domain signal corresponding to a kth modulation symbol, FFT_out$_{k\_}$I and FFT-out$_{k\_}$Q by the I-channel and Q-channel components of the channel impulse response $H_k$ of the $k^{th}$ modulation symbol, Ch_Est_out$_{k\_}$I and Ch_Est_out$_{k\_}$Q, and output the resulting channel-compensated I-channel and Q-channel signal components Est_Sym_out$_{k\_}$I and Est_Sym_out$_{k\_}$Q to the symbol demodulator 410. The power calculator 606 calculates the power of the channel impulse response $H_k$ and outputs the power Est_Sym_ref as the reference point (a).

The symbol demodulator 410 determines the soft metric values corresponding to Est_Sym_out$_{k\_}$I and Est_Sym_out$_{k\_}$Q using a pre-stored signal constellation information and the reference point Est_Sym_ref. A known soft decision algorithm or a later-described soft decision algorithm can be used in determining the soft metric values. The above scheme is applicable to any modulation scheme with a higher order equal to or higher than that of QPSK.

16QAM will be chosen for description of calculating soft metric values to be provided to the decoder 412. Each 16QAM symbol includes four information bits and four soft metric values are determined for the respective four information bits of each 16QAM symbol. The channel-compensated I-channel and Q-channel signal components are denoted by $X_k$ and $Y_k$, respectively.

Figure 7:
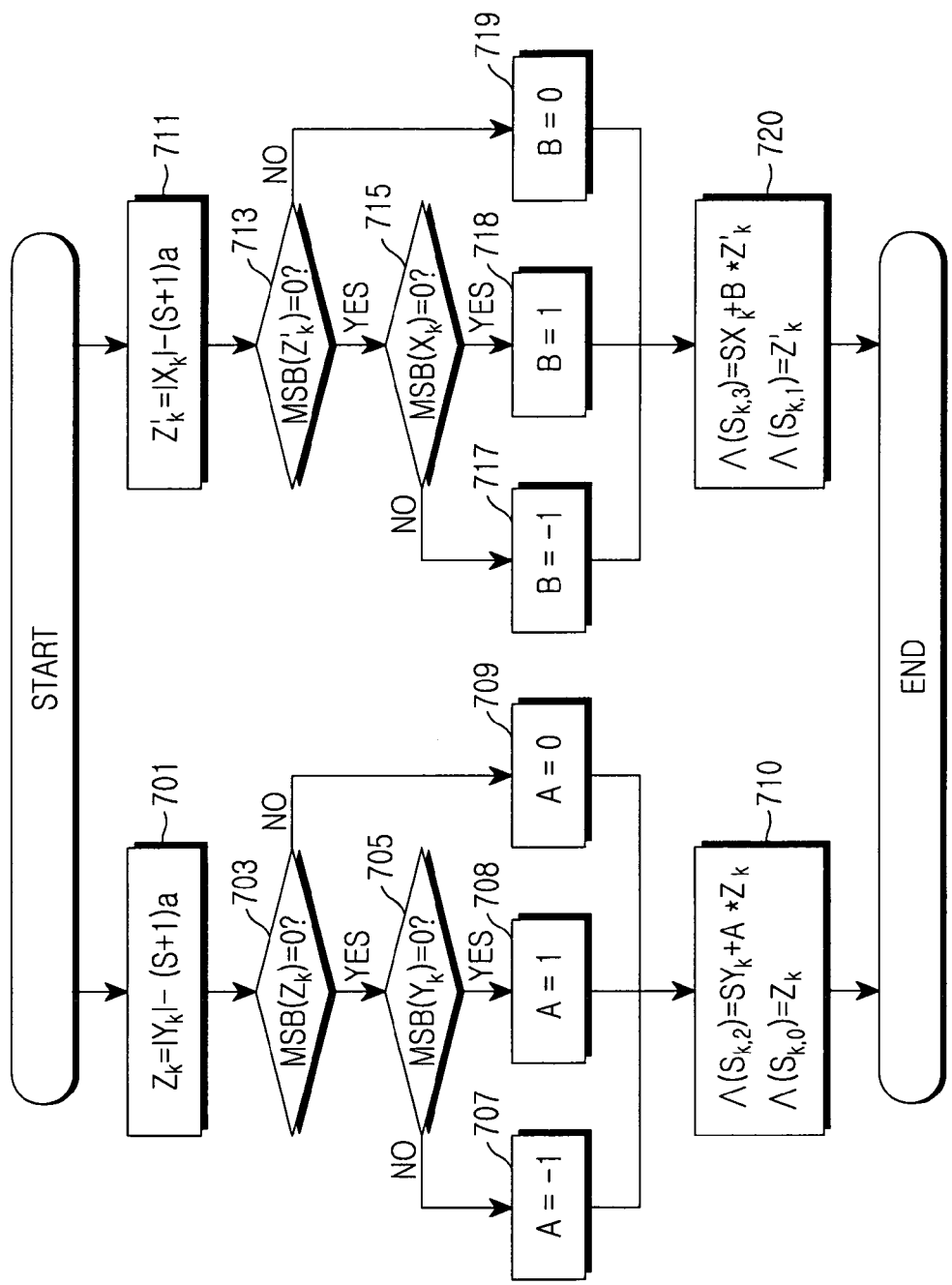
FIG. 7 is a flowchart illustrating an operation for deciding on 16QAM soft metric values to be input to a channel decoder according to an exemplary embodiment of the present invention.

FIG. 7 is a flowchart illustrating an operation for deciding on four 16QAM soft metric values to be input to the channel decoder 412 according to an exemplary embodiment of the present invention. Calculation of soft metric values by the double minimum metric scheme illustrated in FIG. 7 involves two steps. One is to determine a variable A according to $Y_k$ (steps 701 to 709) and a variable B according to $X_k$ (steps 711 to 719). Another step is to create soft metric values for each complex symbol using the variables A and B (steps 710 and 720).

Figure 3:
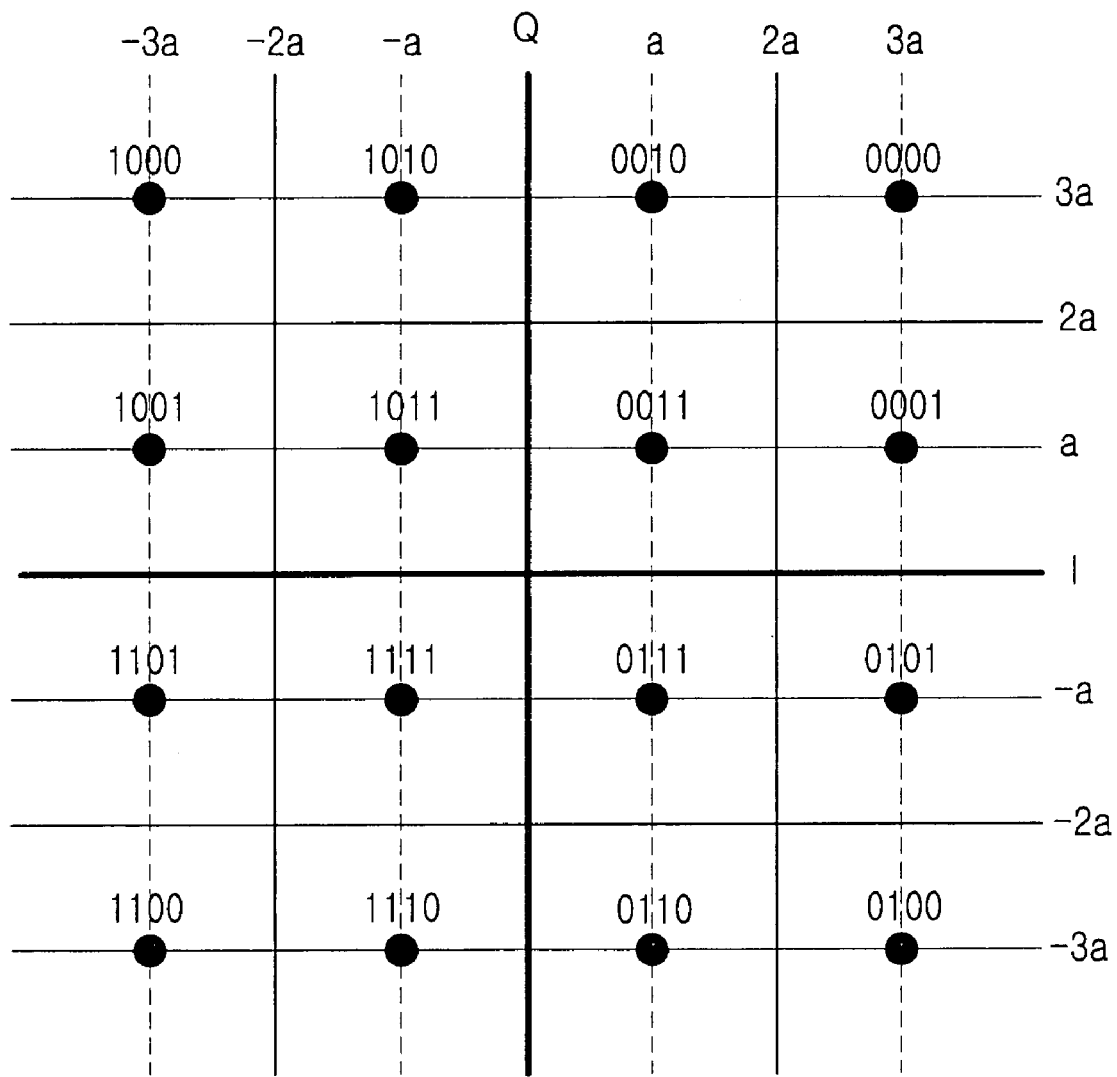
FIG. 3 illustrates an exemplary 16QAM signal constellation for symbol mapping and demapping.

Referring to FIG. 7, the symbol demodulator 410 calculates $Z_k = |Y_k| + (S+1)a$ using a two-dimensional received signal $R_k$ composed of $X_k$ and $Y_k$, the reference point (a), and a multiple S of the distance of a signal point closest to the origin to each axis in the signal constellation, equal to the minimum distance between signal points in step 701. $X_k$, $Y_k$, and $Z_k$ are expressed as digital values each including a sign bit. In the case of the signal constellation illustrated in FIG. 3, S=2. In step 703, the symbol demodulator 410 determines whether $Z_k$ is a positive value. For example, the symbol demodulator 410 determines whether the Most Significant Bit (MSB), such as a sign bit of $Z_k$ is 0. If the MSB is 0, $Z_k$ is a positive value and if the MSB is 1, $Z_k$ is a negative value. If $Z_k$ is a positive value, the symbol demodulator 410 goes to step 705. Otherwise, the symbol demodulator 410 sets the variable A to 0 in step 709.

In step 705, the symbol demodulator 410 determines whether $Y_k$ is 0, that is, whether the MSB of $Y_k$ is 0. If $Y_k$ is a positive value, the symbol demodulator 410 sets the variable A to 1 in step 708. If $Y_k$ is a negative value, the symbol demodulator 410 sets the variable A to −1 in step 707. In step 710, the symbol demodulator 410 then decides the third and first demodulation symbols $S_{k,2}$ and $S_{k,0}$ related to the Q-channel signal component of $R_k$ to be $SY_k + AZ_k$, and $Z_k$, respectively.

According to the above procedure, soft metric values are decided for the third and first demodulation symbols which is the Q-channel signal component. In an exemplary implementation, there is a procedure for deciding soft metric values for the fourth and second demodulation symbols which is the I-channel signal component.

In step 711, the symbol demodulator 410 calculates $Z'_k = |X_k| - (S+1)a$ using $R_k$, (a), and S. $X_k$, $Y_k$, and $Z_k$ are expressed as digital values which each include a sign bit. In step 713, the symbol demodulator 410 determines whether $Z'_k$ is a positive value by comparing the MSB of $Z_k$ with 0. If $Z_k$ is a positive value, the symbol demodulator 410 goes to step 715. If $Z_k$ is not a positive value, the symbol demodulator 410 sets the variable B to 0 in step 719.

In step 715, the symbol demodulator 410 determines whether $X_k$ is 0. More specifically, the symbol demodulator 410 determines whether the MSB of $X_k$ is 0. If $X_k$ is a positive value, the symbol demodulator 410 sets the variable B to 1 in step 718. If $X_k$ is a negative value, the symbol demodulator 410 sets the variable B to −1 in step 717. In step 720, the symbol demodulator 410 then decides the fourth and second demodulation symbols $S_{k,3}$ and $S_{k,1}$ related to the I-channel signal component of $R_k$ to be $SX_k + BZ'_k$, and $Z'_k$, respectively.

The procedure for deciding soft metric values for 16QAM symbols illustrated in FIG. 11 is expressed as $$Z_k = |Y_k| - 2a \qquad (4)$$

$$\Lambda(s_{k,2}) = SY_k + AZ_k, \quad \text{where } A = \begin{cases} 0, & \text{if } MSB(Z_k) = 1 \\ -1, & \text{if } MSB(Z_k) = 0 \text{ and } MSB(Y_k) = 1 \\ 1, & \text{if } MSB(Z_k) = 0 \text{ and } MSB(Y_k) = 0 \end{cases}$$

$$\Lambda(s_{k,0}) = Z_k$$

and $$Z'_k = |X_k| - 2a \qquad (5)$$

$$\Lambda(s_{k,3}) = SX_k + BZ'_k, \quad \text{where } B = \begin{cases} 0, & \text{if } MSB(Z'_k) = 1 \\ -1, & \text{if } MSB(Z'_k) = 0 \text{ and } MSB(X_k) = 1 \\ 1, & \text{if } MSB(Z'_k) = 0 \text{ and } MSB(X_k) = 0 \end{cases}$$

$$\Lambda(s_{k,1}) = Z'_k$$

Figure 8:
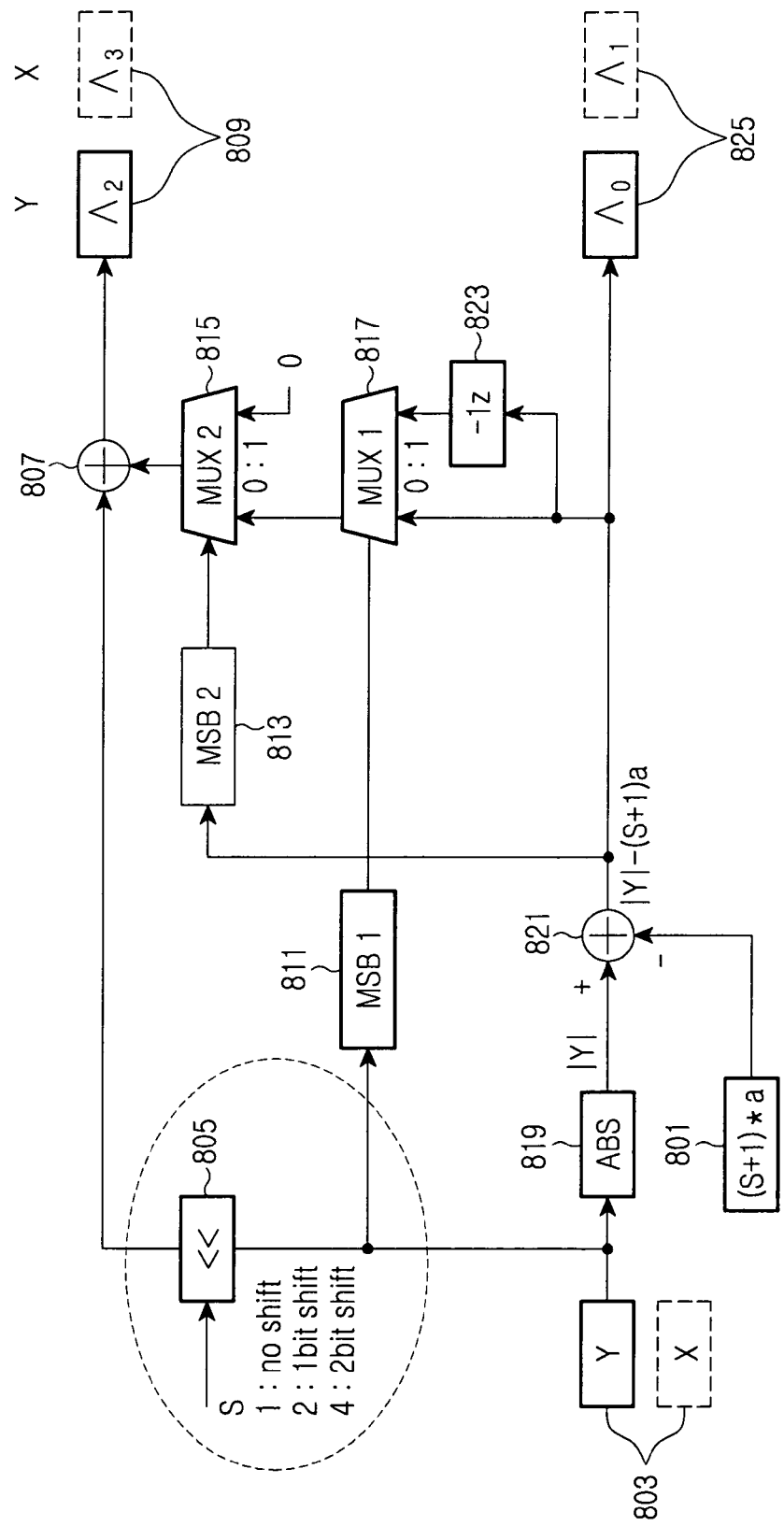
FIG. 8 illustrates the structure of a demodulator for deciding on 16QAM soft metric values according to an exemplary embodiment of the present invention.

FIG. 8 illustrates the hard-ware structure of the symbol demodulator for deciding on 16QAM soft metric values according to an exemplary embodiment of the present invention. Only parts of the symbol demodulator related to the decision of soft metric values for corresponding to $X_k$ and $Y_k$ of a demodulation symbol of a received signal are shown. While the following description is made of the structure and operation of the symbol demodulator regarding $Y_k$, it is to be clearly understood that the same structure for deciding 16QAM soft metric values may be applied to $X_k$.

The received signal $R_k$, the I-channel signal component $X_k$, the Q-channel signal component $Y_k$, and the variables $Z_k$ and $Z'_k$ are expressed as digital values which each include a sign bit. The symbol index is not shown in the following description.

Referring to FIG. 8, an Absolute Value calculator (ABS) 819 calculates the absolute value of one signal component of a received signal R, X, or Y. Thus the absolute value is |Y|. A first calculator 821 calculates Z by subtracting (S+1)a 801 from (Z=−(S+1)a). A multiplier 823 inverts the sign of Z by multiplying −1 by Z. A first MSB extractor 811 extracts the MSB of Y and outputs the MSB as a first selection signal. A second MSB extractor 813 extracts the MSB of Z and outputs the MSB as a second selection signal.

A first multiplexer (MUX) 817 receives Z and −Z from the first calculator 821 and the multiplier 823, respectively and selects one of Z and −Z according to the first selection signal received from the first MSB extractor 811. If the first selection signal is 0, the first selector 817 selects Z and if the first selection signal is 1, the first selector 817 selects −Z. The second MUX 815 receives the output of the first MUX 817 and 0 and selects one of the inputs according to the second selection signal received from the second MSB extractor 812. For example, if the second selection signal is 0, the second MUX 815 selects the output of the first MUX 817, and if the second selection signal is 1, the second MUX 815 selects 0.

A bit shifter 805 receives Y 803, shifts Y by one or two bits according to S, and outputs the resulting shifted signal as SY. If S is 1, the bit shifter 805 simply passes Y. If S is 2, the bit shifter 805 shifts Y by one bit and if S is 4, the bit shifter 805 shifts Y by two bits. A second calculator 807 adds SY to the output of the second MUX 815 and outputs a soft metric value 809 for the third demodulation symbol. Simultaneously, Z calculated in the first calculator 821 is output as a soft metric value 825 for the first demodulation symbol. In the same manner, soft metric values 809 and 825 for the fourth and second demodulation symbols are achieved.

Figure 9:
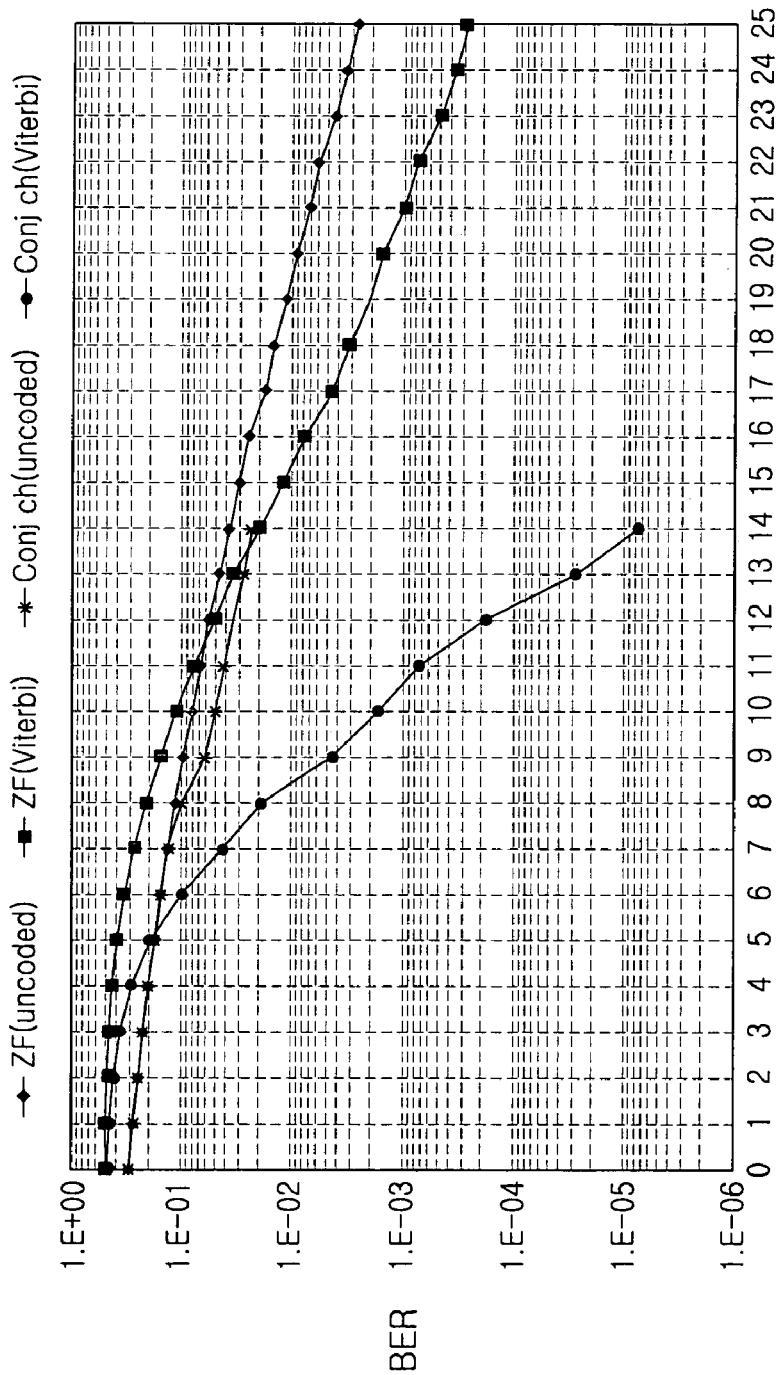
FIG. 9 is a graph comparing conventional technology with an exemplary embodiment of the present invention in terms of Bit Error Rate (BER).

FIG. 9 is a graph comparing conventional technology with an exemplary embodiment of the present invention in terms of BER.

Referring to FIG. 9, a ZF scheme without channel coding (ZF(uncoded)), a ZF scheme with Viterbi decoding (ZF(Viterbi)), a channel compensation scheme without channel coding according to an exemplary embodiment of the present invention (Conj ch(uncoded)), and a channel compensation scheme with Viterbi decoding according to an exemplary embodiment of the present invention (Conj ch(Viterbi)) are compared in terms of BER. As noted from the graph, Conj ch(Viterbi) for deciding soft metric values for Viterbi decoding using a reference point which is the power of a channel impulse response demonstrates much lower BERs than the other schemes.

In accordance with an exemplary embodiment of the present invention as described above, an OFDM receiver avoids division operations of a ZG equalizer, thereby reducing hardware complexity. Also, soft metric values for channel decoding are decided using a reference point which is the power of a channel impulse response. Thus performance is increased.

While the present invention has been shown and described with reference to certain exemplary embodiments thereof, it will be understood by-those skilled in the art that various changes in form and details may be made therein without departing from the spirit and scope of the invention as defined by the appended claims and their equivalents.

What is claimed is:

1. A method of performing channel compensation and symbol demodulation on a received signal in an Orthogonal Frequency Division Multiplexing (OFDM) system, the method comprising:

generating a channel-compensated signal by multiplying a fast Fourier transform (FFT) received signal by an estimated channel impulse response;

calculating the power of the estimated channel impulse response; and setting the power of the estimated channel impulse response as a reference point value defining a minimum distance between signal points in a signal constellation used for modulation of the FFT received signal, and deciding soft metric values for channel decoding of the channel-compensated signal using the reference point value, I-channel and Q-channel signal components of the channel-compensated signal, and a multiple of the reference point value corresponding to the distance of a signal point closest to the origin to each axis in the signal constellation, wherein 16-ary Quadrature Amplitude Modulation (16QAM) is used and the channel-compensated signal modulates the deciding of soft metric values which comprises deciding soft metric values for the channel-compensated signal by $$Z_k = |Y_k| - 2a$$
$$\Lambda(s_{k,2}) = SY_k + AZ_k,$$

$$\text{where } A = \begin{cases} 0, & \text{if } MSB(Z_k) = 1 \\ -1, & \text{if } MSB(Z_k) = 0 \text{ and } MSB(Y_k) = 1 \\ 1, & \text{if } MSB(Z_k) = 0 \text{ and } MSB(Y_k) = 0 \end{cases}$$

$$\Lambda(s_{k,0}) = Z_k$$

and $$Z'_k = |X_k| - 2a$$
$$\Lambda(s_{k,3}) = SX_k + BZ'_k,$$

$$\text{where } B = \begin{cases} 0, & \text{if } MSB(Z'_k) = 1 \\ -1, & \text{if } MSB(Z'_k) = 0 \text{ and } MSB(X_k) = 1 \\ 1, & \text{if } MSB(Z'_k) = 0 \text{ and } MSB(X_k) = 0 \end{cases}$$

$$\Lambda(s_{k,1}) = Z'_k$$

where $Y_k$ and $X_k$ denote the Q-channel signal component and the I-channel signal component of the channel-compensated signal, respectively, $(S_{k,3})$, $(S_{k,2})$, $(S_{k,1})$ and $(S_{k,0})$ denote the soft metric values, a comprises the reference point value, S denotes the multiple of the reference point value corresponding to the distance of a signal point closest to the origin to each axis in the signal constellation, equal to the minimum distance between signal points, and k denotes a symbol index.

2. The method of claim 1, wherein the generating of the channel-compensated signal comprises:

multiplying an I-channel signal component and a Q-channel signal component of the received signal respectively by an I-channel signal component and a Q-channel signal component of the estimated channel impulse response, summing the products from the multiplications, and outputting the sum as the I-channel signal component of the channel-compensated signal; and multiplying the I-channel signal component and the Q-channel signal component of the received signal respectively by the Q-channel signal component and the I-channel signal component of the estimated channel impulse response, summing the products from the multiplications, and outputting the sum as the Q-channel signal component of the channel-compensated signal.

3. A receiving apparatus in an Orthogonal Frequency Division Multiplexing (OFDM) system, comprising:

a Fast Fourier Transform (FFT) processor for Inverse Fast Fourier transform (IFFT)-processing a received signal;

a channel compensator for generating a channel-compensated signal by multiplying the FFT received signal by an estimated channel impulse response and calculating the power of the estimated channel impulse response;

a symbol demodulator for setting the power of the estimated channel impulse response as a reference point value defining a minimum distance between signal points in a signal constellation used for modulation of the FFT received signal, and deciding soft metric values for channel decoding of the channel-compensated signal using the reference point value, I-channel and Q-channel signal components of the channel-compensated signal, and a multiple of the reference point value corresponding to the distance of a signal point closest to the origin to each axis in the signal constellation; and a decoder for recovering information bits by decoding the soft metric values, wherein the symbol demodulator uses 16-ary Quadrature Amplitude Modulation (16QAM) and decides soft metric values which comprises the deciding of soft metric values for the channel-compensated signal by $$Z_k = |Y_k| - 2a$$
$$\Lambda(s_{k,2}) = SY_k + AZ_k,$$

$$\text{where } A = \begin{cases} 0, & \text{if } MSB(Z_k) = 1 \\ -1, & \text{if } MSB(Z_k) = 0 \text{ and } MSB(Y_k) = 1 \\ 1, & \text{if } MSB(Z_k) = 0 \text{ and } MSB(Y_k) = 0 \end{cases}$$

$$\Lambda(s_{k,0}) = Z_k$$

and $$Z'_k = |X_k| - 2a$$
$$\Lambda(s_{k,3}) = SX_k + BZ'_k,$$

$$\text{where } B = \begin{cases} 0, & \text{if } MSB(Z'_k) = 1 \\ -1, & \text{if } MSB(Z'_k) = 0 \text{ and } MSB(X_k) = 1 \\ 1, & \text{if } MSB(Z'_k) = 0 \text{ and } MSB(X_k) = 0 \end{cases}$$

$$\Lambda(s_{k,1}) = Z'_k$$

where $Y_k$ and $X_k$ denote the Q-channel signal component and the I-channel signal component of the channel-compensated signal, respectively, $(S_{k,3})$, $(S_{k,2})$, $(S_{k,1})$ and $(S_{k,0})$ denote the soft metric values, a comprises the reference point value, S denotes the multiple of the reference point value corresponding to the distance of a signal point closest to the origin to each axis in the signal constellation, equal to the minimum distance between signal points, and k denotes a symbol index.

4. The receiving apparatus of claim 3, wherein the channel compensator comprises:

a first complex multiplier for multiplying an I-channel signal component and a Q-channel signal component of the received signal respectively by an I-channel signal component and a Q-channel signal component of the estimated channel impulse response, summing the products from the multiplications, and outputting the sum as the I-channel signal component of the channel-compensated signal to the symbol demodulator;

a second complex multiplier for multiplying the I-channel signal component and the Q-channel signal component of the received signal respectively by the Q-channel signal component and the I-channel signal component of the estimated channel impulse response, summing the products from the multiplications, and outputting the sum as the Q-channel signal component of the channel-compensated signal to the symbol demodulator; and a power calculator for calculating the power of the channel impulse response as the reference point value.

* * * * *

UNITED STATES PATENT AND TRADEMARK OFFICE
CERTIFICATE OF CORRECTION

| | | |
|---|---|---|
| PATENT NO. | : 7,609,615 B2 | Page 1 of 1 |
| APPLICATION NO. | : 11/455784 | |
| DATED | : October 27, 2009 | |
| INVENTOR(S) | : Yim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 566 days.

Signed and Sealed this

Twelfth Day of October, 2010

David J. Kappos
*Director of the United States Patent and Trademark Office*